(12) United States Patent
Mail (10) Patent No.: US 8,944,157 B2
(45) Date of Patent: Feb. 3, 2015

(54) HYDRO PNEUMATIC LIFTING SYSTEM AND METHOD

(76) Inventor: Jacob Mail, Northridge, CA (US)

( * ) Notice: Subject to any disclaimer, the term of this patent is extended or adjusted under 35 U.S.C. 154(b) by 341 days.

(21) Appl. No.: 13/546,810

(22) Filed: Jul. 11, 2012

(65) Prior Publication Data

US 2014/0014318 A1    Jan. 16, 2014

(51) Int. Cl.
*E21B 23/08* (2006.01)

(52) U.S. Cl.
USPC ......... 166/77.4; 166/383; 254/93 R; 254/277; 91/4 R; 92/152; 60/372

(58) Field of Classification Search
USPC .......... 166/77.4, 68, 68.5, 383, 385; 254/2 B, 254/89 HP, 93 R, 102, 134, 277, 360, 368, 254/392, 413; 91/4 R, 394, 396; 92/152; 60/372
See application file for complete search history.

(56) References Cited

U.S. PATENT DOCUMENTS

|     269,994 | A | * |  1/1883 | Bailey ............................. 60/414 |
|   3,559,535 | A | * |  2/1971 | Conolly ........................... 91/396 |
|   4,026,523 | A | * |  5/1977 | Gratzmuller ................ 254/93 R |
|   4,098,491 | A | * |  7/1978 | Larralde ......................... 60/393 |
|   4,191,016 | A | * |  3/1980 | Roth et al. ...................... 60/371 |
|   4,631,918 | A | * | 12/1986 | Rosman .......................... 60/372 |
|   4,715,180 | A | * | 12/1987 | Rosman .......................... 60/372 |
|   4,762,473 | A | * |  8/1988 | Tieben ......................... 417/399 |
|   4,801,126 | A | * |  1/1989 | Rosman ..................... 254/93 R |
|   4,848,085 | A | * |  7/1989 | Rosman .......................... 60/372 |
|   5,116,032 | A | * |  5/1992 | Strachan ........................... 5/614 |
|   5,238,087 | A | * |  8/1993 | Garrido et al. ................. 187/253 |
|   5,536,150 | A | * |  7/1996 | Tucker .......................... 417/390 |
|   5,901,814 | A | * |  5/1999 | Adifon et al. ................. 187/253 |
|   5,957,779 | A | * |  9/1999 | Larson ............................ 472/34 |
|   5,975,246 | A | * | 11/1999 | Toschi .......................... 187/275 |
|   5,996,688 | A | * | 12/1999 | Schultz et al. ................... 166/72 |
|   6,116,025 | A | * |  9/2000 | Tucker ............................ 60/372 |
|   6,213,722 | B1 | * | 4/2001 | Raos ............................. 417/53 |
|   6,662,905 | B2 | * | 12/2003 | Sors .............................. 187/347 |
|   7,490,674 | B2 | * |  2/2009 | Brecheisen ................... 166/369 |
|   7,530,799 | B2 | * |  5/2009 | Smith .......................... 417/390 |
|   8,267,378 | B1 | * |  9/2012 | Rosman ..................... 254/93 R |
|   8,562,308 | B1 | * | 10/2013 | Krug et al. .................... 417/237 |

OTHER PUBLICATIONS

Dictionary definition of "affix", accessed Sep. 8, 2014 via thefreedictionary.com.*

* cited by examiner

*Primary Examiner* — Blake Michener (57) ABSTRACT

The disclosed invention introduces an efficient lifting mechanism for reciprocating vertically a load system, the load consisting of the aggregate weights of a cargo payload in conjunction with "dead weights" of moving parts of the lifting apparatus.
The disclosed invention uses a hydro-pneumatic linear actuator to lift the load and a pressurized accumulator, acting as a force intensifier. The pressurized accumulator, acting as a self-contained stored energy source, provides to the actuator adequate power to lift the "dead weights" plus part of the cargo payload. An external power source provides to the actuator adequate power to lift the remainder of the cargo payload. The disclosed invention saves significant amounts of power and energy in applications in which the "dead weights" are sizable compared to the cargo load. The disclosed invention provides also exceptional means for accurate motion control of the cargo payload.

20 Claims, 6 Drawing Sheets

(a) ACTUATOR RETRACTED (DOWN)  (b) ACTUATOR EXTENDED (UP)  (c) ACTUATOR MID STROKE

HYDRO PNEUMATIC LIFTING SYSTEM AND METHOD

BACKGROUND OF THE INVENTION

1. Field of the Invention

The disclosed invention relates to the field of lifting mechanisms employed to lift loads vertically. More specifically, it relates to lifting systems wherein the total lifted load comprises relative heavy components of the lifting apparatus itself. Typical embodiments of the disclosed invention apply, but are not limited, to hydraulic lifts, hydraulic cranes and rod lifting hydraulic pumps used to extract fluids from deep subsurface formations.

A typical example of an embodiment of the invention is an elevator lift. The total load lifted by typical elevator lifts includes weights of the cargo car and the cables, in addition to the useful lifted payload of passengers or other cargo. Most frequently, the weights of the cargo car and the cables constitute a significant portion of the total weight. The energy spent on lifting these "dead weights" is pure waste since it is producing useless work.

Another example pertains to rod-lifting technology, applied in oil and gas wells to extract fluids from subsurface formations, using beam pumps (also known as "horse head" pumps). The total load lifted by a typical rod-lifting pump comprises the useful payload of the oil column in the well casing tube in combination with the weights of the moving parts of the pump, which include the downhole pump, the rod string that connects the downhole pump to the surface-mounted pump and certain other parts of the lifting apparatus. Similar to the example of the elevator lift, the energy spent to lift the components of the lifting apparatus in every pumping cycle is wasteful since it produces useless work. In an oil or gas well application, the energy waste is even more pronounced, since the weights of the lifting apparatus (rod string, downhole pump, etc.) are relatively big compared to the weight of the cargo load (the fluid column), making up to 75 percent of the total load in deep wells. The amount of wasted energy and the associated operating costs are directly related to the duty cycle speed and the depth of the well.

The disclosed invention introduces an efficient lifting mechanism, using built-in, light-weight, stored energy resources to offset the "dead weight" loads, thus limiting the use of external energy to the amount required to lift the useful payload only, namely the cargo payload of an elevator, or the fluid column of an oil well, as referred to in the aforementioned examples.

2. Description of Prior Art

Lifts and cranes are common lifting mechanisms, typically using platforms, cables and pulleys to move loads vertically. The total load that a typical lift or crane moves comprises the sum of the lifted payload (the useful load) and the weight of certain moving components of the lifting apparatus, such as the platform, cables and pulleys to which the payload is attached. In many of these common applications, the combined weights of the moving parts of the lifting apparatus form a significant percentage of the total lifted load. The energy spent to lift these components is clearly wasted since this amount of energy is not producing any useful work.

There is an economic need to develop an efficient lifting mechanism, which uses external energy only to lift the useful payload, while minimizing any amount of energy spent on lifting components of the lifting apparatus.

Applied in a variety of lifting mechanisms and methods, prior art has been utilizing the "counterweight" concept as a method to balance, thus offset, weights of moving components (also termed hereinafter as "dead weight") of the lifting apparatus, thereby reducing its operating power consumption and increasing its efficiency.

The following fourteen issued patents and published patent applications are the closest prior art known to the inventor of this invention, relating to the field of the disclosed invention.

1. U.S. Pat. No. 269,994 issued to Walter M. Bailey on Jan. 2, 1883 for "Elevator" (hereinafter the "Bailey Patent");
2. U.S. Pat. No. 4,715,180 issued to Alan H. Rosman on Dec. 29, 1987 and assigned to Dynamic Hydraulic Systems, for "Hydraulic Lift Mechanism" (hereinafter the "Rosman Lift Patent I");
3. U.S. Pat. No. 4,801,126 issued to Alan H. Rosman on Jan. 31, 1989 and assigned to Dynamic Hydraulic Systems, for "Hydraulically Operated Lift Mechanism" (hereinafter the "Rosman Lift Patent II");
4. U.S. Pat. No. 5,238,087 issued to Alfonso Garrido et al on Aug. 24, 1993 and assigned to Otis Elevator Company, for "Advanced Energy Saving Hydraulic Elevator" (hereinafter the "Garrido Patent");
5. U.S. Pat. No. 5,901,814 issued to Leandre Adifon et al on May 11, 1999 and assigned to Otis Elevator Company, for "Hydraulic Elevator Having a Counterweight" (hereinafter the "Adifon Patent");
6. U.S. Pat. No. 5,975,246 issued to Renzo Toschi on Nov. 2, 1999 and assigned to Otis Elevator Company, for "Hydraulically Balanced Elevator" (hereinafter the "Toschi Patent");
7. U.S. Pat. No. 5,957,779 issued to Walter F. Larson on Sep. 28, 1999 for "Tower" (hereinafter the "Larson Patent");
8. U.S. Pat. No. 6,662,905 issued to Carlos Alberto Sors on Dec. 16, 2003 for "Elevator which counterweight is also the plunger of the propelling fluid dynamic device which produces and controls the movements thereof" (hereinafter the "Sors Patent");
9. U.S. Pat. No. 5,996,688 issued to Glenn Schultz et al on Dec. 7, 1999 and assigned to Ecoquip Artificial Lift, for "Hydraulic Pump Jack Drive System For Reciprocating an Oil Well Pump Rod" (hereinafter the "Schultz Patent");
10. U.S. Pat. No. 4,762,473 issued to James Tieben on Aug. 9, 1988 for "Pumping Unit Drive System" (hereinafter the "Tieben Patent");
11. U.S. Pat. No. 4,631,918 issued to Alan H. Rosman on Dec. 30, 1986 and its continuation U.S. Pat. No. 4,848,085, issued on Jul. 18, 1989 and assigned to Dynamic Hydraulic Systems, for "Oil Well Pumping System Or The Like" (hereinafter the "Rosman Pump Patents");
12. U.S. Pat. No. 7,530,799B2 issued to Norris E. Smith on May 12, 2009 for "Long-Stroke Deep-Well Pumping Unit" (hereinafter the "Smith Patent");
13. U.S. Pat. No. 6,213,722 issued to Davor J. Raos on Apr. 10, 2001 for "Sucker Rod Actuating Device" (hereinafter the "Raos Patent");

Bailey's U.S. Pat. No. 269,994, issued in as early as 1883, discloses a hydraulic (water based) lifting system for elevators, comprising a single-acting lifting actuator reciprocating an elevator via a set of pulleys and cables, an accumulator acting as a counterweight, a hydraulic pump and hydraulic conduits. The pump is installed in-line between the counterweight accumulator and the lifting cylinder. Hydraulic fluid in the counterweight accumulator is constantly under pressurized gas. To lift the elevator, the pump directs pressurized flow from the counterweight accumulator to the cylinder. Moving in and out, the cylinder operates a set of pulleys and cables, from which the elevator is suspended, reciprocating the elevator up and down. The power delivered by the counterweight to the cylinder is sized to an average value between a nominal load up and a nominal load down. A main drive spins the hydraulic pump in the desired direction, reciprocating the elevator up and down by porting flow from the counterweight to the cylinder, or in the opposite direction, thus operating also as a flow directional valve. If the lifted load is greater than the nominal average, the pump augments an amount of power required to lift only the incremental load. Changing its rotation direction, the pump allows the cargo load to descend, now porting flow back to the counterweight accumulator, thus recharging it and readying the system for the next duty cycle.

Rosman's U.S. Pat. No. 4,715,180 discloses a hydraulic lift mechanism, comprising a single-acting lifting actuator reciprocating a load directly, or via a set of pulleys and cables, an accumulator acting as a counterweight, a hydraulic pump and hydraulic conduits. The pump is installed in-line between the counterweight accumulator and the lifting cylinder. Hydraulic fluid in the counterweight accumulator is constantly under pressurized gas. To lift the elevator, the pump directs pressurized flow from the counterweight accumulator to the cylinder. Moving in and out, the cylinder reciprocates a load directly, or via a set of pulleys and cables from which the load is suspended. The power delivered by the counterweight to the cylinder is sized to lift the "dead-load" plus an average value between a maximum "live-load" and a minimum "live-load". A main drive spins the hydraulic pump in the desired direction, reciprocating the cylinder and the load up and down by porting flow from the counterweight to the cylinder, or in the opposite direction, thus operating also as a flow directional valve. If the lifted load is greater than the counterweight force, the pump augments an amount of power required to lift only the incremental load. Changing its rotation direction, the pump allows the cargo load to descend, now porting flow back to the counterweight accumulator, thus recharging it and readying the system for the next duty cycle. In another embodiment, a hydraulic motor, driving a drum and cable, is used instead of a hydraulic linear actuator.

Rosman's U.S. Pat. No. 4,801,126 discloses a hydraulic lift mechanism, comprising a dual-acting, three-volume actuator reciprocating a load via a set of pulleys and cables, an accumulator acting as a counterweight, a hydraulic pump, control valves and hydraulic conduits. The actuator comprises three tubular members, dividing its internal space into three volumes. The first volume is connected to a gas pressurized accumulator, providing a bias force extending the actuator, thus counterbalancing the "dead-load" plus a portion of the "live-load". A closed-circuit variable displacement pump ports hydraulic fluid to the two other hydraulic volumes. Porting fluid to the second volume provides a force retracting the actuator, whereas porting fluid to the third volume provides a force extending the actuator and augmenting the counterweight extension force. According to this invention, "the capacity of the system is for a rated load which comprises a fixed dead-load component and a live-load component of unestablished magnitude, and in which the pressure of preloading fluid supplied from said accumulator to said first volume is preselected to balance said lift system with equal hydraulic pressure in both said lines where the live-load component is at a preselected level intermediate a zero live-load condition and a maximum live-load condition." In reading this patent, it is unclear whether the first volume is using pressurized gas, or is it using fluid under pressure to provide the counterbalancing force; the detailed description of this patent implies that " . . . The first of these volumes is identified A and is an annulus charged with gas pressure via connection 32 to the charged interior of leg structure 13. Gas pressure in volume A is always operative over the full annular area of piston 27, urging piston 27 in the direction opposed to the gravitational force of load . . . ", whereas claim 1 speaks of " . . . an accumulator for supplying fluid under substantially uniform preloading pressure to said first volume . . . ". In addition, the preferred embodiment shown in FIG. 2 presents a risk of entrapping a sizable amount of air in the enclosed upper part of the third hydraulic volume during normal operation, which can cause severe degradation of performance and ultimately failure of the system. The invention disclosed herein introduces a substantial improvement over this patent by avoiding air entrapments in any of its hydraulic space.

Garrido's U.S. Pat. No. 5,238,087 discloses a hydraulic lifting system for elevators, comprising a double-acting hydraulic actuator and a counterweight mechanism to offset the weight of the elevator car. In a preferred embodiment, the lifting mechanism comprises a pulley and a rope wrapped around it, the elevator car suspended from one side of the rope and a counterweight mass suspended from the other end. the actuator attaches directly to the counterweight mass. The weight of the counterweight mass is equal to the combined weights of the elevator car and half the weight of the cargo load (termed as "the duty load"). To move the elevator upward, the actuator applies to the counterweight a force equal in size to half the weight of the cargo load, working in the same direction as the counterweight. To move the elevator downward, the actuator applies to the counterweight a force no greater than half the weight of the cargo load, working in the opposite direction. The patent discloses an additional embodiment, featuring a pulley system that acts as a stroke multiplier, creating a desired ratio between the stroke of the elevator and the stroke of the actuator. This patent utilizes the concept of an efficient and compact lifting system by using the gravity force of shear weights to counterbalance the dead weight of elevator cars.

Adifon's U.S. Pat. No. 5,901,814 discloses a hydraulic lifting system for elevators, comprising a single-acting hydraulic actuator and a counterweight mechanism to offset the weight of the elevator car. The lifting mechanism further comprises a pulley and a rope wrapped around it, the elevator car suspended from one side of the rope, its other end attached to a counterweight mass. The weight of the counterweight mass is equal to the weight of the elevator car. To move the elevator upward, the actuator applies to the counterweight a force equal to the weight of the cargo load, working in the same direction as the counterweight. The patent discloses alternative pulley embodiments that act as stroke multipliers, creating a desired ratio between the stroke of the elevator and the stroke of the actuator. This patent is using the gravity force of shear weights to counterbalance the dead weight of the elevator car apparatus.

Toschi's U.S. Pat. No. 5,975,246 discloses a hydraulic lifting system for elevators, comprising a first single-acting lifting ram reciprocating a load, a second single-acting ram acting as a counterweight, a hydraulic pump, a control valve and hydraulic conduits. The hydraulic pump and the control valve are installed in-line between the lifting ram and the counterweight ram. The hydraulic fluid in the counterweight ram is constantly pressurized by weights pressing on the ram's piston. To lift the cargo load the control valve directs pressurized flow from the counterweight ram to the hydraulic pump, which ports hydraulic fluid to the lifting ram, lifting the cargo load. The power delivered by the counterweight to the hydraulic pump is sized to generate sufficient power to lift the car (the dead weights) plus half the cargo load. An electric motor, driving the hydraulic pump, augments the power required to lift the balance of the cargo load, namely half of its weight. Changing the state of the control valve reverses the process, allowing the cargo load to descend, the pump now porting flow back to the counterweight ram and lifting the counterweight load, thus readying the system for the next duty cycle. This patent features alternative embodiments using a plurality of counterweight rams. It also features alternative embodiments of pulley and cable provisions, providing a diversity of preferable stroke and speed ratios between the drive and the cargo.

Larson's U.S. Pat. No. 5,957,779 discloses a hydraulic lifting system for lifting people in gondola cars to the top of amusement park towers. The lifting system comprises a vertically mounted long stroke hydraulic actuator and a pulley system that doubles the stroke and speed of the gondola cars relative to the actuator. This patent is using the gravity force of shear weights to counterbalance the dead weight of the actuator piston.

Sors's U.S. Pat. No. 6,662,905 discloses a hydraulic lifting system for elevators, comprising a dual-acting hydraulic actuator and a counterweight mechanism to offset the weight of the elevator car. In its preferred embodiment, the elevator is suspended from a cable wrapped over the top of a pulley. The other end of the cable is connected to the piston of a hydraulic cylinder mounted vertically in an elevator pier. When hydraulic flow is applied to the hydraulic ports of the actuator, the piston reciprocates in and out of the actuator's cylinder, lifting and descending the elevator. This patent is unique in using the weight of the piston as a counterweight. According to this patent, the weight of the piston is sized to approximately the weight of the elevator car plus about half of the weight of the cargo load. A hydraulic pump provides to the actuator additional power required to lift the remaining half weight of the cargo load. A variety of alternative embodiments suggests use of single-acting actuators, pneumatic power instead of hydraulics and integration of a hydraulic pump and valves into the piston-counterweight assembly. The feasibility and practicality of this concept may be limited by the ability to package a sizable counterweight mass inside the body of the actuator's piston.

Schultz's U.S. Pat. No. 5,996,688 discloses a counterweighted hydraulic lifting system for recovering fluids from subsurface formations. The system comprises a plurality of single acting hydraulic cylinders, mounted on top of a wellhead and connected via a rod string to a downhole pump. As the wellhead-mounted cylinder(s) reciprocate, they move up and down the rod string and the downhole pump, lifting a column of fluid from the well in every stroking cycle. A master cylinder powers the wellhead cylinder(s), providing hydraulic fluid and pressure via hydraulic conduits. The master cylinder comprises two coaxial cylinders in series, mounted to a common central bulkhead. A single piston reciprocates inside the master cylinder bore. The single piston comprises multi piston heads of similar diameter assembled to a single piston rod, dividing the cylinders into several functional chambers. The chambers are connected via hydraulic conduits to hydraulic power supplies, providing flow and pressure to reciprocate the piston. A first chamber is connected via a hydraulic conduit to a first utility port of a hydraulic pump, that when pressurized pushes the piston down, pushing hydraulic flow from the master cylinder into the wellhead cylinders, lifting the wellhead cylinders, the downhole pump and the column of fluid in the downhole bore. A second chamber in the master cylinder is connected via a hydraulic conduit to a second utility port of a hydraulic pump, that when pressurized pushes the piston up. As the piston moves up, hydraulic fluid from the wellhead cylinders is allowed to flow back into the master cylinder, allowing the wellhead cylinders and the downhole pump to descend and fill up for the next pumping cycle. A hydraulic accumulator, charged with gas, provides hydraulic pressure to a third chamber in the cylinder. The accumulator pressure is pushing on the master cylinder piston, thus intensifying the utility pressure in the wellhead cylinders, thereby acting as a counterweight force providing a consistent bias force upward to offset the dead weights of the rod string and the downhole pump. The multiple wellhead cylinders and the structure of multiple cylinders in series in the master cylinder make this lifting mechanism relatively complicated and costly due its great number of components, as well as cumbersome to build and assemble compared to embodiments of the disclosed invention.

Tieben's U.S. Pat. No. 4,762,473 discloses another counterweighted hydraulic lifting system for recovering fluids from subsurface formations. The system comprises a hydraulic dual cylinder system, wherein the cylinders are connected coaxially in series. A single piston, reciprocating inside the cylinders coaxial bores, connects to the rod string and the downhole pump. As the piston reciprocates, it is pumping fluid from the well. The single piston comprises multi piston heads of similar diameter, dividing the cylinders into several functional chambers. The chambers are connected via hydraulic conduits to hydraulic power supplies, providing flow and pressure to reciprocate the piston. A first chamber is connected via a hydraulic conduit to a first utility port of a hydraulic pump, that when pressurized pushes the piston up, lifting the downhole pump and the column of oil above it. A second chamber is connected via a hydraulic conduit to a second utility port of a hydraulic pump, that when pressurized pushes the piston down, enabling the downhole pump to descend and fill up for the next pumping cycle. A hydraulic accumulator, charged with gas, provides hydraulic flow to a third chamber in the cylinder, acting as a counterweight by providing a consistent bias force upward, thereby offsetting the dead weights of the piston, the rod string and the downhole pump. The structure of multiple cylinders in series makes this lifting mechanism very tall and its relatively great number of components makes it complicated to build and assemble compared to the disclosed invention. In addition, the uniform cylinder bore constrains the operating pressures in the functional chambers when trying to achieve the desired operating forces.

Rosman's U.S. Pat. No. 4,631,918 and its continuation U.S. Pat. No. 4,848,085 disclose a counterweighted hydraulic lifting system for recovering fluids from subsurface formations. The disclosed apparatus comprises a single-acting hydraulic cylinder, mounted on top of a wellhead and connected via a rod string to a downhole pump, an accumulator acting as a counterweight, a hydraulic pump and hydraulic conduits. As the wellhead-mounted cylinder reciprocates, it moves up and down the rod string and the downhole pump, lifting a column of fluid from the well in every cycle. These patents are based on the principles of the aforementioned Rosman's U.S. Pat. No. 4,715,180. A hydraulic pump is installed in-line between the counterweight accumulator and the lifting cylinder. Hydraulic fluid in the counterweight accumulator is constantly under pressurized gas. A main drive spins the hydraulic pump in the desired direction, reciprocating the cylinder up and down by porting flow from the counterweight to the cylinder, or in the opposite direction. To move the cylinder up, the pump directs pressurized flow from the counterweight accumulator to the cylinder. The power delivered by the counterweight to the cylinder is sized to enable lifting of the dead weights of the rod string and the downhole pump plus half the load of the fluid column above the downhole pump. The hydraulic pump augments an amount of power sufficient to lift only the incremental load of half the weight of the fluid column, thereby saving a considerable amount of power and energy. Changing its rotation direction, the pump allows the cargo load to descend, now porting flow back to the counterweight accumulator, thus recharging it and readying the system for the next duty cycle.

Smith's U.S. Pat. No. 7,530,799B2 discloses another counterweighted hydro-mechanical rod-lifting system for recovering fluids from subsurface formations. The system comprises a pulley mounted over the wellhead, having a cable wrapped over its top. The rod string is connected to one end of the cable and a counterweight is supended from its other end, counterbalancing the dead weight of the downhole pump and the rod string. The system comprises a vertically mounted dual pulley and a chain (or a belt), driven by a hydrostatic transmission. The pulleys are mounted at a certain distance from each other, with a chain wrapped around them. The lower pulley shaft is rotated by a hydraulic motor, driven by a hydraulic pump, while the upper pulley is rotating freely. As the hydraulic motor rotates the lower pulley, the chain reciprocates up or down rotating the upper pulley. The counterweight is provided by the gravity force of shear weights attached to the chain. As the lower pulley is commanded to rotate, the chain moves around the pulleys, moving the counterweight up or down along the linear span between the two pulleys. As the chain drives the counterweight up and down, the rod string and the downhole pump reciprocate accordingly, lifting a column of fluid on every upstroke. The load lifting capacity is determined by the counterweight and the torque capacity of the hydraulic motor. The direction and the speed of the lifted load are determined by the rotation direction and the speed of the hydraulic motor respectively.

Raos's U.S. Pat. No. 6,213,722 discloses another counterweighted lifting system for recovering fluids from subsurface formations. The system comprises a direct-drive linear electromagnetic motor, mounted vertically on a wellhead, its armature connected via a rod string to a downhole pump. As the motor's armature is commanded up and down, it reciprocates the downhole pump, lifting a column of fluid in every cycle. Almost every motion parameter of the device can be programmed to provide a desired pumping profile. A spring means counterbalances the weights of the stator, the rod string and the downhole pump. This patent sites helical springs, pneumatic or hydraulic accumulators as alternative embodiment of counterweight means.

Counterweighted (also known as "Counterbalanced") lifting systems have been applied widely for decades. The novelty of the disclosed invention presents an exceptional compact light-weight mechanism, comprising a considerable fewer number of components, superior performance attributes, higher efficiencies and energy conservation advantages and superior reliability, durability and maintainability properties, demonstrating substantial improvement over prior art and other existing technologies. The improvements of the disclosed invention are specifically pronounced in applications characterized by sizable heavy lifting apparatus. Unlike many of prior art inventions, the disclosed invention is feasible and practical in a great variety of applications, covering a broad range from light to very heavy loads and long strokes.

Further novel features and other aspects of the present invention will become apparent from the following detailed description, discussion, figures and the appended claims.

SUMMARY OF THE INVENTION

The disclosed invention introduces a hydro pneumatic load lifting mechanism, addressing expressly cases wherein a total lifted load comprises two components of comparable size: (a) the useful net cargo payload, and (b) parts of the lifting mechanism that are reciprocating simultaneously with the cargo load (termed hereinafter also as the "dead weight"). Typical examples include, but are not limited to lifts using platforms, elevator cars, cables and pulleys that are part of the lifting apparatus.

The total load that a typical lift system moves comprises the sum of the lifted payload (termed hereinafter also as the "useful payload" or the "cargo load") plus the weight of certain moving parts of the lifting system like the cargo car, cables and pulleys, to which the useful load is attached. In this typical application, the combined weights of the moving parts of the lifting apparatus form a significant percentage of the total load moved by the lifting system. The energy spent to lift these parts is wasted since this energy does not produce any useful work. There is an economic and environmental need to develop an efficient lifting mechanism, which uses an exact amount of external energy required to lift only the useful payload, while minimizing the amount of energy spent on lifting "dead weight" components of the lifting apparatus.

There is also a need to enable effective motion control of the reciprocated loads, motion control defined herein as open loop or closed loop control of the direction, position, velocity, start-stop, acceleration and deceleration of the payload.

The disclosed invention is based on the use of a highly efficient hydro pneumatic linear actuator, its lifting force intensified by a super lightweight pneumatic spring mechanism.

It is the objective of the disclosed invention to provide new means to enhance vertical lifting capability of cargo loads.

A specific objective of the disclosed invention is to provide a superior vertical lifting system, optimized for power and energy efficiencies.

Another specific objective is to provide a superior lifting system, using a most compact power supply to lift the load.

Another specific objective is to provide a superior lifting system, featuring excellent motion control, adaptability and compliance properties.

Another specific objective is to provide a superior lifting system, featuring improved reliability and durability characteristics.

Another specific objective is to provide a low maintenance lifting system, featuring improved maintainability characteristics.

Another specific objective is to provide a safe lifting system, featuring advanced environmental friendly attributes.

Said objectives are achieved by the disclosed invention as detailed hereinafter. The particular lifting system employed in this invention comprises a sophisticated hydro pneumatic linear actuator (termed hereinafter as the "actuator"), in combination with a pneumatic counterweight mechanism. In a variety of embodiments the hydraulic actuator is a double-acting triple-cavity actuator, connected to a plurality of pressurized vessels (termed hereinafter also as "counterweight tanks"), the purpose of which is to counterbalance the weights of moving parts ("dead weights") of the lifting apparatus.

The actuator is mounted vertically on a structural base, with the loads attached to its free standing top. As the actuator moves up and down, it reciprocates the loads accordingly. The hydro pneumatic actuator is reciprocated up and down by a supply of hydraulic flow provided by a hydraulic closed-circuit pump. The hydraulic pump is operated by a primary drive, which can be an electric motor, or a combustion engine. In a preferred embodiment, the actuator has three functional cavities (termed hereinafter also as "chambers"): an UP cavity, a DOWN cavity and a COUNTERWEIGHT cavity. Said UP cavity and said DOWN cavity are connected respectively to two utility ports of said hydraulic pump. When said hydraulic line UP is pressurized, said actuator is extended, moving the load upward. When said hydraulic line DOWN is pressurized, said actuator is retracted, moving the load downward. Said COUNTERWEIGHT cavity is connected to a plurality of gas-charged tanks. During operation, said pressurized gas in said counterweight tank(s) constantly pressurizes said COUNTERWEIGHT cavity in said actuator. The pressure in said COUNTERWEIGHT cavity applies an upward constant force. By setting the counterweight charge pressure, said force is calibrated to balance the downward force exerted on the actuator by the gravity weights of the moving parts (dead weights) of the lifting apparatus plus a portion of the cargo load.

Counterweighted (also known as "counterbalanced") lifting systems have been applied widely for decades. The novelty of the present invention introduces an exceptional compact mechanism, comprising a fewer number of components, a considerable lighter counterweight mechanism, superior performance attributes and significant energy saving advantages. A most important novelty of the disclosed invention relates to enhanced reliability and durability properties compared to prior art and other existing technologies.

These novel features and other aspects of the disclosed invention will become apparent from the following detailed description, discussion, figures and the appended claims.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the presented invention are described herein with reference to the drawings, it should be understood that such embodiments are by way of example only. They merely illustrate but a small number of the many specific embodiments, which can represent applications of the principles of the present invention. Various changes and modifications, obvious to those skilled in the art to which the present invention pertains, are deemed to be within the spirit, scope and contemplation of the present invention, as further defined in the appended claims.

The disclosed invention introduces a compact, lightweight, hydro-pneumatic system for lifting cargo loads. Typical applications of the disclosed invention include, but are not limited to, man and cargo lifts, cranes, amusement park rides and rod-lifting pumps for extraction of fluids from subsurface formations.

The use of the disclosed invention for oil extraction from subsurface formations is of special interest because it presents tremendous benefits over other conventional rod-lifting methods like the conventional beam pump (also known as a "horse head" pump). Said applications and the rod-lifting pump in particular, are used herein frequently as examples for clarification purposes only; they are not intended to limit the scope of other applications based on the principles of the disclosed invention.

In further detail, the disclosed invention provides new means to enhance vertical lifting capability of cargo loads.

In further detail, the disclosed invention provides a superior vertical lifting system, optimized for power and energy efficiencies.

In further detail, the disclosed invention provides a superior lifting system, using a most compact power supply to lift the load.

In further detail, the disclosed invention provides a superior lifting system, featuring excellent motion control, adaptability and compliance properties.

In further detail, the disclosed invention provides a superior lifting system, featuring improved reliability and durability characteristics.

In further detail, the disclosed invention provides a low maintenance lifting system, featuring improved maintainability characteristics.

Figure 1:
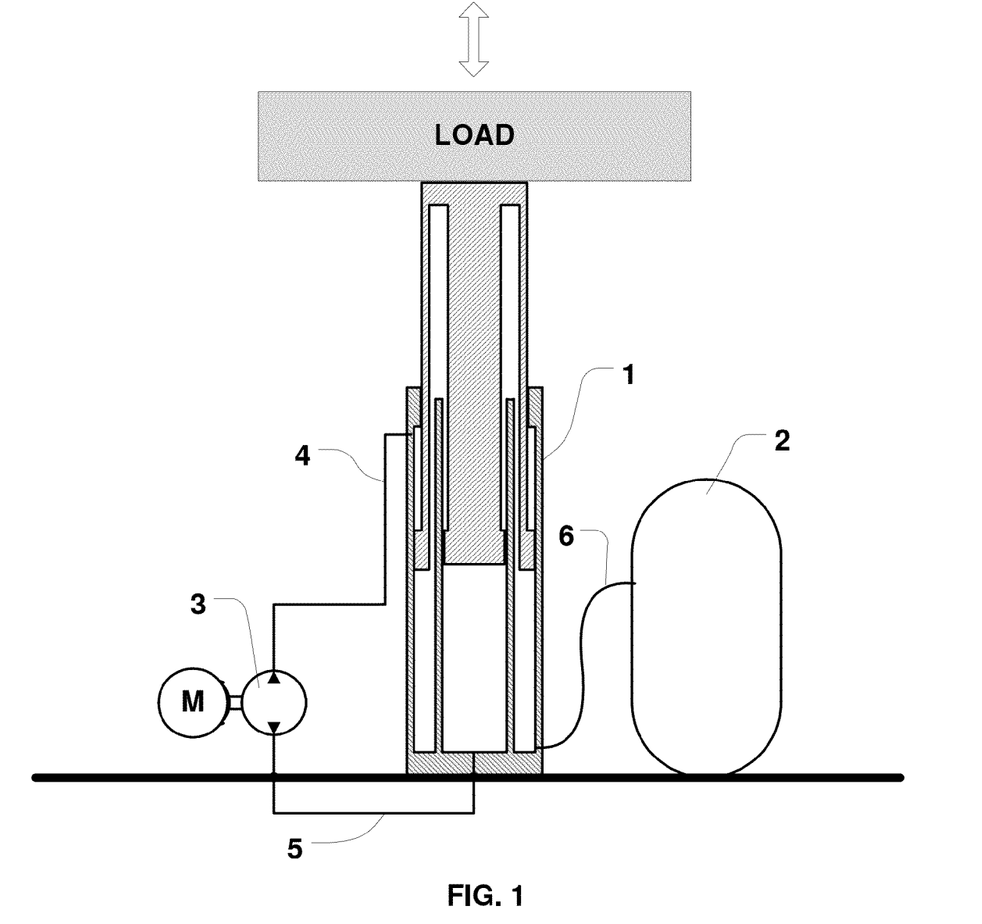
FIG. 1 is a schematic structural view of a preferred embodiment of the disclosed hydro pneumatic lifting system, showing its major components: a vertically mounted, double-acting, triple-cavity hydro pneumatic actuator, a counterweight tank and a hydraulic pump driven by an auxiliary power source.

In further detail, the disclosed invention provides a safe lifting system, featuring advanced environmental friendly attributes. FIG. 1 illustrates a preferred embodiment of the disclosed invention. A preferred embodiment of the disclosed lifting mechanism comprises two major components: (a) a double-acting triple-cavity hydraulic actuator 1, and (b) a plurality of pressure vessels 2, (termed hereinafter also as "counterweight tanks").

Figure 2:
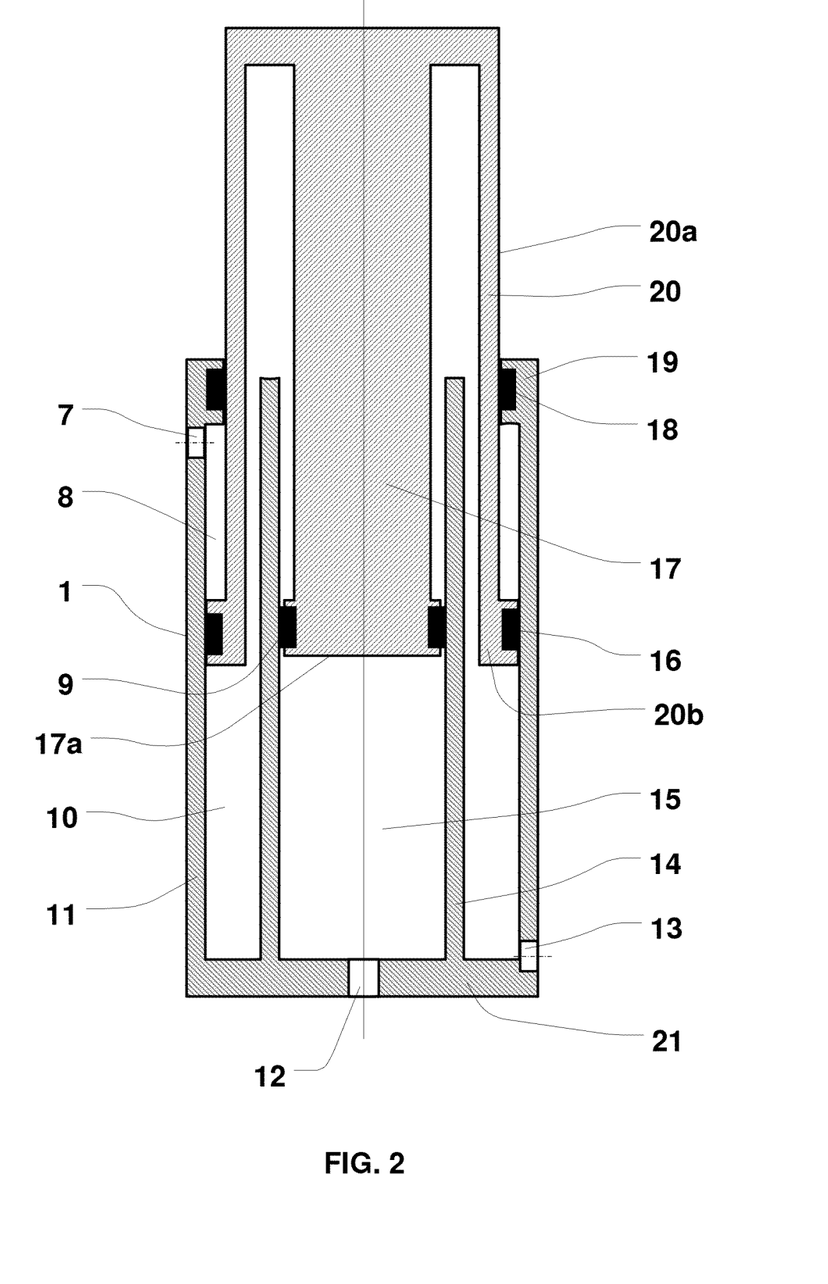
FIG. 2 is a detailed cross section view through the schematic structure of the hydro pneumatic actuator of the disclosed invention, showing its major components.

Said hydraulic actuator 1 provides the platform and the force integrator means to reciprocate the load. In a preferred embodiment, said hydraulic actuator 1 comprises four tubular members, forming three functional cavities (termed hereinafter also as "chambers"), as shown in FIG. 2. Said four tubular members are: outer cylinder 11, outer piston 20, inner cylinder 14 and inner piston 17. Said cavities are: (a) UP chamber 15 that, when pressurized, forces said actuator 1 to extend up, (b) DOWN chamber 8 that, when pressurized, forces said actuator 1 to retract down, and (c) COUNTERWEIGHT chamber 10 that is constantly pressurized, providing a constant extension force up. In said embodiment, the lifted loads are attached at the top of said actuator 1. More specifically, the loads are attached to the top of said outer piston 20, which is the reciprocating part of said actuator 1, as shown in FIG. 1.

Figure 3:
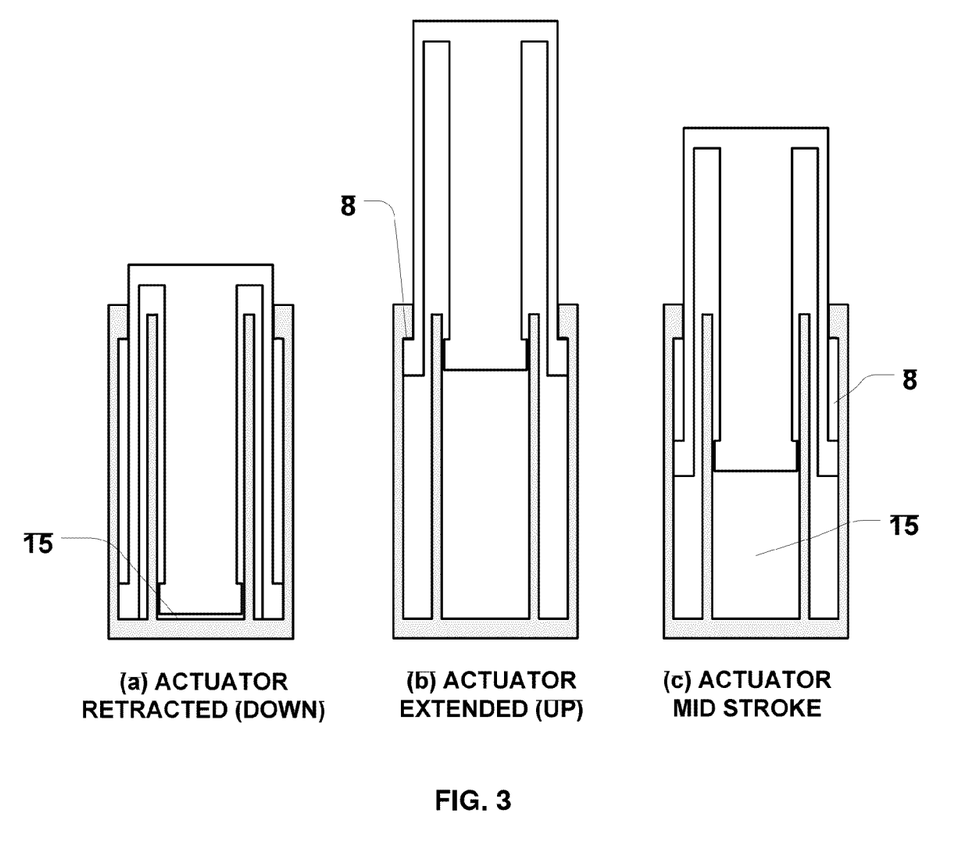
FIG. 3 shows the actuator schematic in its fully extended (UP) position, its fully retracted (DOWN) position and in a mid-stroke position.

FIG. 2 shows in further detail a schematic cross section of a preferred embodiment of said hydraulic actuator 1. Four tubular members divide said actuator 1 into three functional chambers. An outer cylinder 11 mounted vertically on a structural base. An outer piston 20, said outer piston sliding vertically during operation in the bore of said outer cylinder 11, as shown in FIG. 3. Said outer piston 20 further comprising a piston rod 20a and a piston head 20b. The annular cavity formed between the bore of said outer cylinder 11 and said piston rod 20a forms said hydraulic DOWN chamber 8, as shown in FIG. 2. End cap 21 caps the bottom of said cylinder 11. Inner cylinder 14 is affixed to said end cap 21, in concentricity with said outer cylinder 11. Inner piston 17 is affixed to said outer piston 20 at its upper end, and is sliding during operation inside the bore of inner cylinder 14. The cavity enclosed inside the bore of said inner cylinder 14 beneath face surface 17a forms said hydraulic UP chamber 15. The cavity enclosed in the annular space between the bore diameter of said outer cylinder 11 and the bore diameter of said inner cylinder 14 forms COUNTERWEIGHT chamber 10. Said chamber 10 is charged with gas, preferably nitrogen.

Although shown schematically in FIG. 2 as a single component, said inner cylinder 14, end cap 21 and outer cylinder 11 are fabricated, in a preferred embodiment, as separate parts, which are then assembled together. Similarly, although shown in FIG. 2 as a single component, said outer piston 20 and inner piston 17 are fabricated, in a preferred embodiment, as separate parts, then assembled together, both parts reciprocating simultaneously as a single component (termed hereinafter also as the "Piston"). Dynamic seals 9 and 16, installed in inner piston 17 and in piston head 20b respectively, prevent leakage of fluid or gas across said chambers. Dynamic seal 18 prevents external leakage from said DOWN chamber 8. Other static sealing means and detailed structural components are part of a variety of detailed potential embodiments of the disclosed invention.

Said UP chamber 15 and said DOWN chamber 8 comprise hydraulic ports 12 and 7 respectively. Said UP and DOWN cavities 8 and 15 are connected via hydraulic conduits 4 and 5 to the respective utility ports of a closed-circuit hydraulic pump 3, as shown in FIG. 1. Said hydraulic pump 3 supplies hydraulic flow to respective DOWN port 7 and UP port 12 of said hydraulic actuator 1.

The volume of said COUNTERWEIGHT chamber 10 changes as said piston 20 reciprocates up and down in said outer cylinder 11. Since chamber 10 is an enclosed volume, the mass of its contained gas remains constant during operation. Gas pressure in chamber 10 is inversely proportional to its volume in accordance with Boyle's Law of Thermodynamics. The incremental change in the COUNTERWEIGHT pressure, as said actuator 1 strokes from one extreme position to the other, depends on the total volume of gas and on the incremental change in volume during operation; a greater total volume of gas decreases the differential pressure between a fully extended and a fully retracted positions. In a preferred embodiment, in order to maintain a consistent counterweight force, the change in COUNTERWEIGHT pressure during operation is maintained, preferably, at less than ten percent. According to the preferred embodiment, this ratio is accomplished by providing a total COUNTERWEIGHT volume at least ten times greater than the incremental volumetric change of chamber 10 during operation. Since it may be impractical to contain such volume of gas inside said actuator, in a preferred embodiment, such volume is provided by a plurality of pressure vessels that are interconnected to each other and to COUNTERWEIGHT chamber 10. The aggregate volume of compressed gas in the pressure vessels is sized to minimize the differential pressure during a full stroke to no greater than ten percent, thus providing a consistent counterbalancing force during operation. FIG. 1 shows COUNTERWEIGHT cavity 10 in said actuator 1 connected to a single counterweight tank 2 via conduit 6. In alternative embodiments, the total volume of gas can be provided by a plurality of counterweight tanks, the inner spaces of which are interconnected to provide said aggregate volume.

In a preferred embodiment, the input shaft of said hydraulic pump 3 is coupled to an output shaft of a prime mover (the coupled pump and prime mover are referred hereinafter also as the "power train"). Said prime mover provides to said hydraulic pump 3 input torque sufficient to sustain full operating hydraulic pressure to support the desired operating forces. In a preferred embodiment, said hydraulic pump is a closed-circuit variable displacement type, driven by an electric motor operating at constant speed, or by any type of a diversity of combustion engines and fuels. In the preferred embodiment, hydraulic flow to the actuator is controlled by adjusting the volumetric displacement of said hydraulic pump. In an alternative embodiment, the power train can comprise a closed-circuit fixed displacement pump, coupled to an electric motor, the speed of said electric motor controlled by a variable speed drive. In this embodiment, the volumetric displacement of said pump is constant and hydraulic flow to the actuator is controlled by adjusting the speed of said electric motor.

In a preferred embodiment, a controller commands the direction and the flow rate of said hydraulic pump 3, thus controlling the up and down motion parameters of said actuator, including its direction, position, speed, start-stop, accelaration and deceleration momentary characteristics. When the controller commands the actuator to move up, said hydraulic pump ports flow to said UP chamber 15, building up hydraulic pressure. This hydraulic pressure creates a pushing force on said inner piston 17. This force adds up to the upward force on outer piston 20, created by gas pressure in said COUNTERWEIGHT chamber 10. Hydraulic pressure in UP chamber 15 builds up until the total force overcomes the external loads, moving said outer piston 20 up, thus lifting the load. When said controller commands the actuator to move down, said hydraulic pump ports flow to said DOWN chamber 8, building up hydraulic pressure and a force down. This force, combined with the "dead weight" load, now oppose the extending force created by the COUNTERWEIGHT pressure in said chamber 10. Hydraulic pressure in said DOWN chamber 8 builds up until it overcomes the counterweight force, moving the outer piston down, thereby retracting said actuator 1.

In further detail, the disclosed invention provides a superior vertical lifting system, optimized for power and energy efficiencies in an exceptional compact and lightweight packaging. The least amount of energy required to lift a load to a certain height is equal to the weight of the total lifted load multiplied by the elevated height.

Non-counterbalanced lifting devices must provide a lifting force that is equal to, or greater than the combined weights of the useful cargo load plus the "dead weight" of the lifting apparatus. Accordingly, the least amount of auxiliary energy required to lift a load to a certain height equals the weight of the total load multiplied by the elevated height.

Some conventional lifting devices save auxiliary power by counterbalancing the load of the "dead weights". Counterbalancing mechanisms are commonly self-contained energy storing devices. They apply their stored energy to lift the "dead weight" loads on the upstroke, while restoring their energy on the downstroke. Most counterweighted systems require auxiliary power to lift only the useful payload, therefore their auxiliary power resource is smaller than those of non-counterweighted systems; their lifting force capacity is sized to lift the useful cargo load and the amount of energy they use is equal to the weight of the cargo load multiplied by the elevated height. Due to the considerable load of dead weights in long stroking elevators and deep oil wells, the use of a counterweighted system saves significant amounts of auxiliary energy and other associated costs. It also enables to reduce respectively the size of the auxiliary power plant powering the lifting apparatus. Most conventional lifting devices use the inertia of the "dead weight" to reciprocate the lifting device down, without using any external power on the downstroke.

The disclosed invention presents an opportunity to further reduce the power consumption and the physical size of the auxiliary power plant. According to the disclosed invention, the counterweight force is designed to lift the total weight (the dead weight plus the payload) less half the difference between the maximum payload up and the minimum payload down. Accordingly, the auxiliary force is sized to lift only half of the difference between the maximum payload up and the minimum payload down, consuming no more than half the amount of auxiliary power and energy required by conventional systems. An identical amount of auxiliary power and energy are consumed during the downstroke. This attribute of the disclosed invention reduces the size of the auxiliary power plant to half, or less, compared to equivalent conventional counterbalanced lifting devices.

In further detail, the preferred embodiment of said actuator 1 is designed to provide the aforesaid up and down forces. Gas pressure in said chamber 10 is acting on its effective area providing a COUNTERWEIGHT force up, said force equal to the total lifted weights less half the difference between the maximum payload up and the minimum payload down. Said effective area of COUNTERWEIGHT chamber 10 is defined as the annular area contained between the bore diameter of said outer cylinder 11 and the bore diameter of said inner cylinder 14. Said effective area of chamber 10 is determined by said diameters and is sized to provide said desired counterweight force when subjected to the charge pressure in said chamber 10. On upstroke command, hydraulic pressure, acting on face 17a provides a force pushing said inner piston 17 up. The effective hydraulic area of chamber 15 is defined as the circular area of the bore diameter of said inner cylinder 14. Said effective area is determined by said bore diameter and is sized to provide an upward force, equal to about half the difference between the maximum payload up and the minimum payload down, at maximum hydraulic operating pressure. On downstroke command, hydraulic pressure, acting on the effective area of chamber 8, provides a force pushing said outer piston 20 down. Said effective hydraulic area DOWN is defined as the annular area contained between the bore diameter of said outer cylinder 11 and the outer diameter of said outer piston rod 20a. Said effective area is determined by said diameters and is sized to provide a downward force equal to about half the difference between the maximum payload up and the minimum payload down at maximum hydraulic operating pressure. In summary, since auxiliary power is required to lift no more than half of the payload, the disclosed invention enables to reduce the size of the hydraulic effective areas of said actuator, thus requiring less hydraulic flow. Smaller flow rates are enabling to employ considerably smaller auxiliary power supplies compared to non-counterweighted and other conventional counterweighted lifting apparatus. For example, in an embodiment of the disclosed invention in a passenger elevator application, the elevator may carry a full payload capacity up and travel completely unloaded down. In this case, the difference between the maximum payload up and the minimum payload down is equal to the maximum weight capacity of the passengers. Accordingly, the counterweight effective area is designed to provide a force equal to the dead weights of the car plus half the maximum weight capacity of the passengers. The auxiliary force, provided by the hydraulic power supply, is sized to half the maximum weight capacity of the passengers. A similar example, referring to embodiment of the disclosed invention in a rod-lifting pump in oil or gas wells, is presented hereafter in detail.

Another example pertains to embodiment of the disclosed invention in a gondola tower, or the like, in amusement parks, where said preferred embodiment is used to lift a plurality of gondola cars and passengers to the top of a tall tower. In this case, the lifting apparatus carries the same loads up and down and the difference between the maximum payload up and the minimum payload down is miniscule (theoretically zero). Accordingly, minimal auxiliary force and power are required since almost all the lifting work is done by the counterweight.

A great number of the aforementioned prior art inventions use a lifting actuator and an accumulator with a hydraulic pump installed in-line between them, the pump directing hydraulic flow from the accumulator to the actuator and vice versa. While this concept has the benefit of counterbalancing the dead weight, it disadvantageously requires high flow rates of hydraulic fluid. According to the aforesaid, the preferred embodiment of the disclosed invention is using hydraulic fluid to move only an incremental load, while the dead weights and a portion of the useful load are moved by expansion and compression of compressed gas. This enables to use small hydraulic effective areas in said actuator, as well as smaller hydraulic pumps, conduits and control valves, saving substantial real estate and cost, thus presenting a major improvement over prior art.

The common use of heavy weights as counterbalancing means in many prior art inventions is known to cause high dynamic inertia loads during acceleration and deceleration, overstressing components and causing often great damage when stopping abruptly. Use of compressed gas as a counterweight means in the disclosed invention, instead of heavy and bulky weights, provides better means to tightly control the dynamic motion of the lifted loads and preventing overstressing of the lifting apparatus, thus presenting another major improvement over prior art.

Moreover, the considerable smaller power plant embodiments, enabled by the disclosed invention, present further opportunity to reduce substantially other energy losses related to Coulomb friction, hydraulic pressure and flow losses and electrical losses. In summary, these smaller losses further increase the overall energy savings of the system, presenting additional weight and size saving opportunities, a smaller installed footprint and improved mobility.

In further detail, the disclosed invention features an additional important innovative attribute, enhancing its reliability and longevity and mitigating downtime and maintenance costs. Air entrapped in a hydraulic system tends to flow up through the hydraulic fluid and accumulate in enclosed cavities that are not flushed out by the hydraulic flow during operation. Presence of air in hydraulic systems increases the compressibility of the hydraulic fluid, making the system "spongy", affecting its responsiveness and causing premature mechanical failures due to foaming and cavitation. Entrapped air, if not flushed out with the hydraulic fluid during operation, degrades the system's performance, requiring periodical maintenance intervention to remove the air. Entrapped air is commonly removed periodically by using air bleeding valves and is required to be performed as routine maintenance operation. An effective design method to eliminate air entrapment in hydraulic systems is by avoiding air pockets in hydraulic components and vessels and creating a flow path for the hydraulic fluid to flush through the entire inner space of all hydraulic parts during operation. Lifting mechanisms using long, vertically mounted hydraulic actuators are susceptible to air entrapment in the upper parts of their hydraulic cavities, causing frequent degradation of performance, premature failure, costly downtime and repair intervention. The disclosed invention features a vertically mounted long stroke actuator, which prevents accumulation of air in its hydraulic chambers and eliminates the need for periodical manual air bleeding. In the preferred embodiment, avoidance of air accumulation is accomplished by flushing out almost the entire hydraulic fluid in every operating cycle of said actuator. As shown in FIG. 3(a), the volume of fluid and any air entrapped in said hydraulic UP chamber 15 during upstroke, is forced out from the UP chamber when the actuator is fully retracted on the downstroke (the volume of hydraulic cavity 15 at the fully retracted position is almost completely diminished). Similarly, hydraulic fluid and any entrapped air are flushed out from DOWN chamber 8 on the upstroke when the actuator is fully extended, as shown in FIG. 3(b). This perpetual self airbleeding process prevents detrimental accumulation of air in the hydraulic chambers during operation. For example, oil and gas rod-lifting pumps have an almost non-stop duty cycle, with very little human intervention. Very often, they operate in remote areas in harsh environmental conditions, which make their repair and maintenance challenging. The disclosed invention enables to extend their longevity and durability, preventing enormous production downtime losses and enhancing their profitability. This attribute of the disclosed invention is therefore critically important in prolonging the uptime of lifting systems and is a major improvement over prior art.

Figure 4:
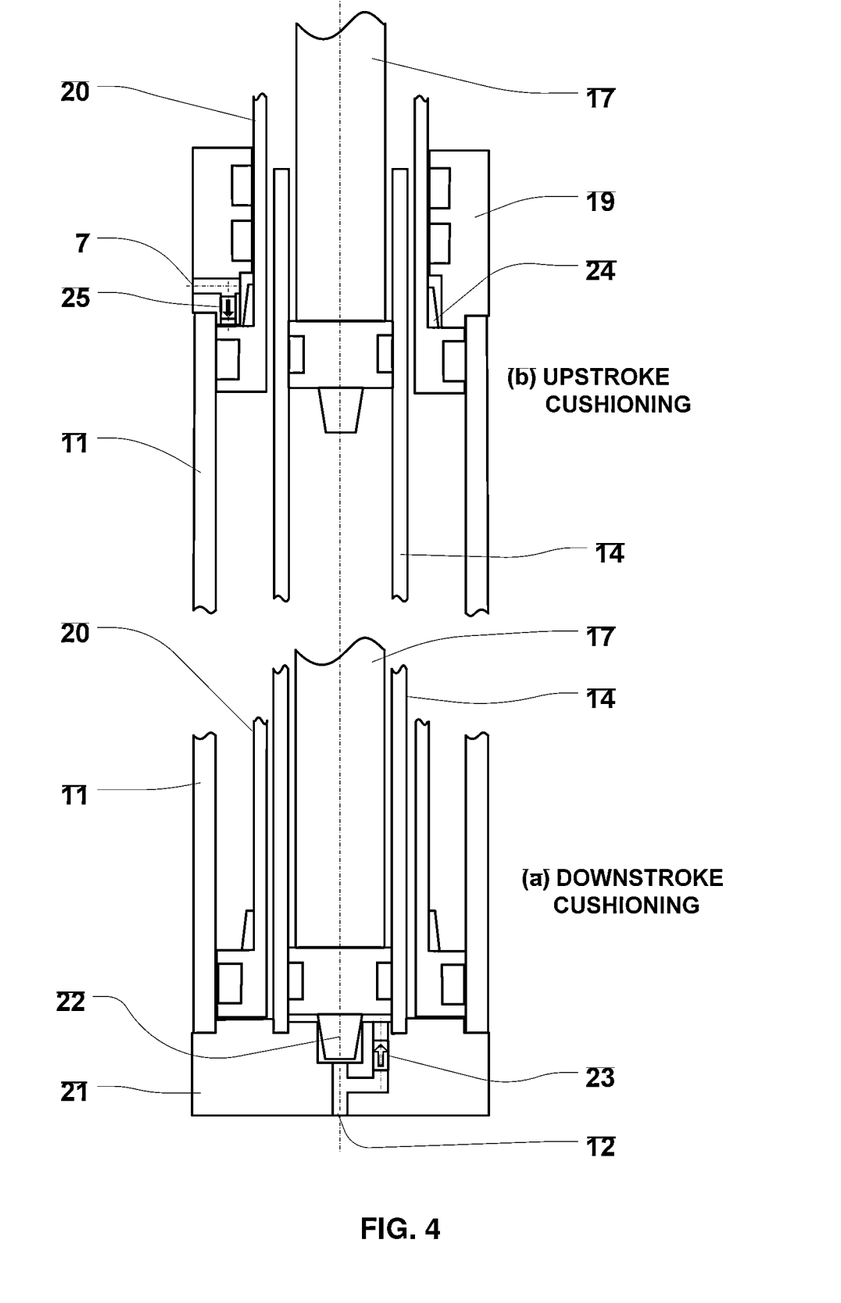
FIG. 4 shows an embodiment of cushioning provisions in the actuator to prevent impact loads at its end strokes.

In a preferred embodiment, shown in FIG. 4, said actuator 1 comprises cushioning means to avoid inadvertent impact loads when said piston 20 comes to stop at its up or down end strokes. Said cushioning means are based on slowing down the velocity of said piston 20 as it approaches the up or down end stroke, by metering hydraulic fluid through annular orifices. As shown in FIG. 4(b), the means for downstroke cushioning comprise a dome shaped pin 22 mounted onto said first face 17a of said inner piston and a cylindrical cavity in said end cap 21, said cavity connected to said hydraulic port 12 of said first chamber 15. The bore diameter of said cavity is slightly bigger than the outer diameter of said pin 22, said pin 22 forming a first annular orifice between its outer diameter and the bore diameter of said cavity when entering said cavity. On downstroke, as said pin 22 enters said cavity, hydraulic fluid in said first chamber 15 is forced to flow out through said orifice, slowing down said piston 20. In a preferred embodiment, said pin 22 has a variable longitudinal profile such that said first orifice cross section area is decreasing as said pin 22 moves into said cavity, said profile shaped to provide a desired deceleration of said outer piston. Said means for downstroke cushioning further comprising a first check valve 23 between said hydraulic port 12 and said first chamber 15, said valve enabling one way flow from said hydraulic port to said first chamber, blocking flow in the opposite direction, thus enabling unrestricted hydraulic flow into said first chamber on upstroke.

As shown in FIG. 4(a), the means for upstroke cushioning comprise a sleeve 24 mounted onto said outer piston rod 20a, adjacent to said outer piston head 20b, and a cylindrical cavity in said cylinder head 19, said cavity connected to said hydraulic port 7 of said second chamber 8. The bore diameter of said cavity is slightly bigger than the outer diameter of said sleeve 24, said sleeve forming a second annular orifice between said sleeve and said cavity when entering said cavity. On upstroke, as said sleeve 24 enters said cavity, hydraulic fluid in said second chamber 8 is forced to flow out through said orifice, slowing down said piston 20. In a preferred embodiment, said sleeve 24 has a variable longitudinal profile, such that the second orifice cross section area is decreasing as said sleeve 24 moves into said cavity, said profile shaped to provide a desired deceleration of said outer piston. Said means for upstroke cushioning further comprising a second check valve 25 between said hydraulic port 7 and said second chamber 8, said valve enabling one way flow from said hydraulic port to said second chamber, blocking flow in the opposite direction, thus enabling unrestricted hydraulic flow into said second chamber on downstroke. This attribute of the disclosed invention is a major improvement over prior art, prolonging the uptime of the lifting apparatus by preventing severe damage to said actuator due to unintended collision of its parts during operation.

Another principal attribute of the disclosed invention is its exceptional ability to control very tightly the up and down motion parameters of the load, specifically its direction, position, start-stop, velocity, acceleration and deceleration at any point along its path. Its intrinsic properties enable unmatched adaptability to a broad diversity of input conditions and parameters. Intrinsic properties of the disclosed invention include: (a) inherent compliance of hydraulic power, (b) low inertia loads of the moving parts of the lifting system, (c) simple linear relationships between input parameters, such as hydraulic flow, and output parameters, such as actuator speed, and (d) exceptional ability to monitor and control remotely every operating parameter. These attributes enable to optimize performance, minimize onsite intervention and reduce initial and operating costs.

Figure 5:
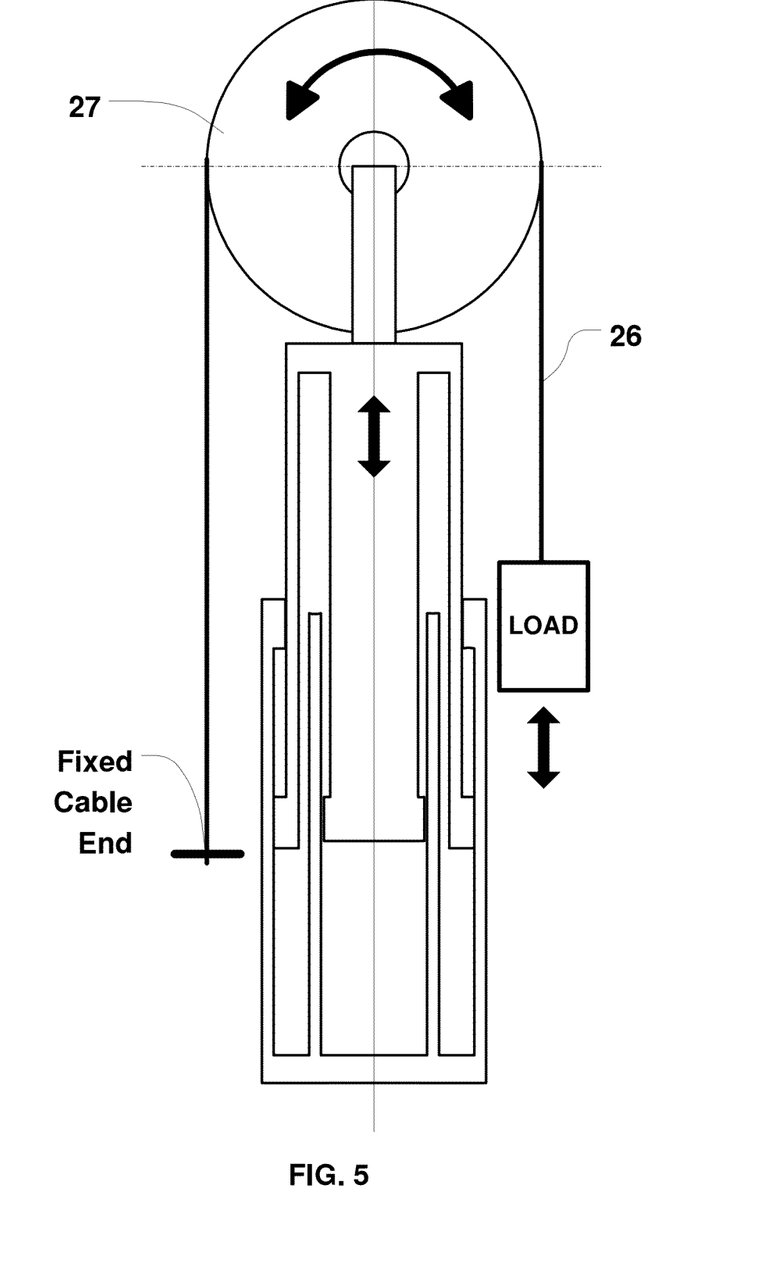
FIG. 5 is a schematic view of an embodiment of said actuator, equipped with a pulley and cable provisions, which double the stroke and speed of the lifted load.

In an alternative embodiment shown in FIG. 5, the lifting system features a pulley 27 mounted on top of said actuator 1 and a cable 26 wrapped around said pulley. As shown in FIG. 5, the lifted loads are suspended from one side of said cable 26, while its other end is affixed to the structure. As said actuator 1 reciprocates said pulley 27 up and down, said cable rolls on said pulley, moving the loads in parallel to said actuator 1. In said embodiment, the loads move at twice the speed of said actuator 1 and twice its stroke. Said embodiment is an efficient method to double the lifting speed and the stroke length without doubling the length of said actuator 1, while maintaining all other attributes of the disclosed invention. A pulley and cable embodiment is also shown in the oil well rod-lifting pump embodiment in FIG. 6. In alternative embodiments, said pulley and cable embodiment can be substituted by a gear and chain, or by a sheave and belt embodiments.

Figure 6:
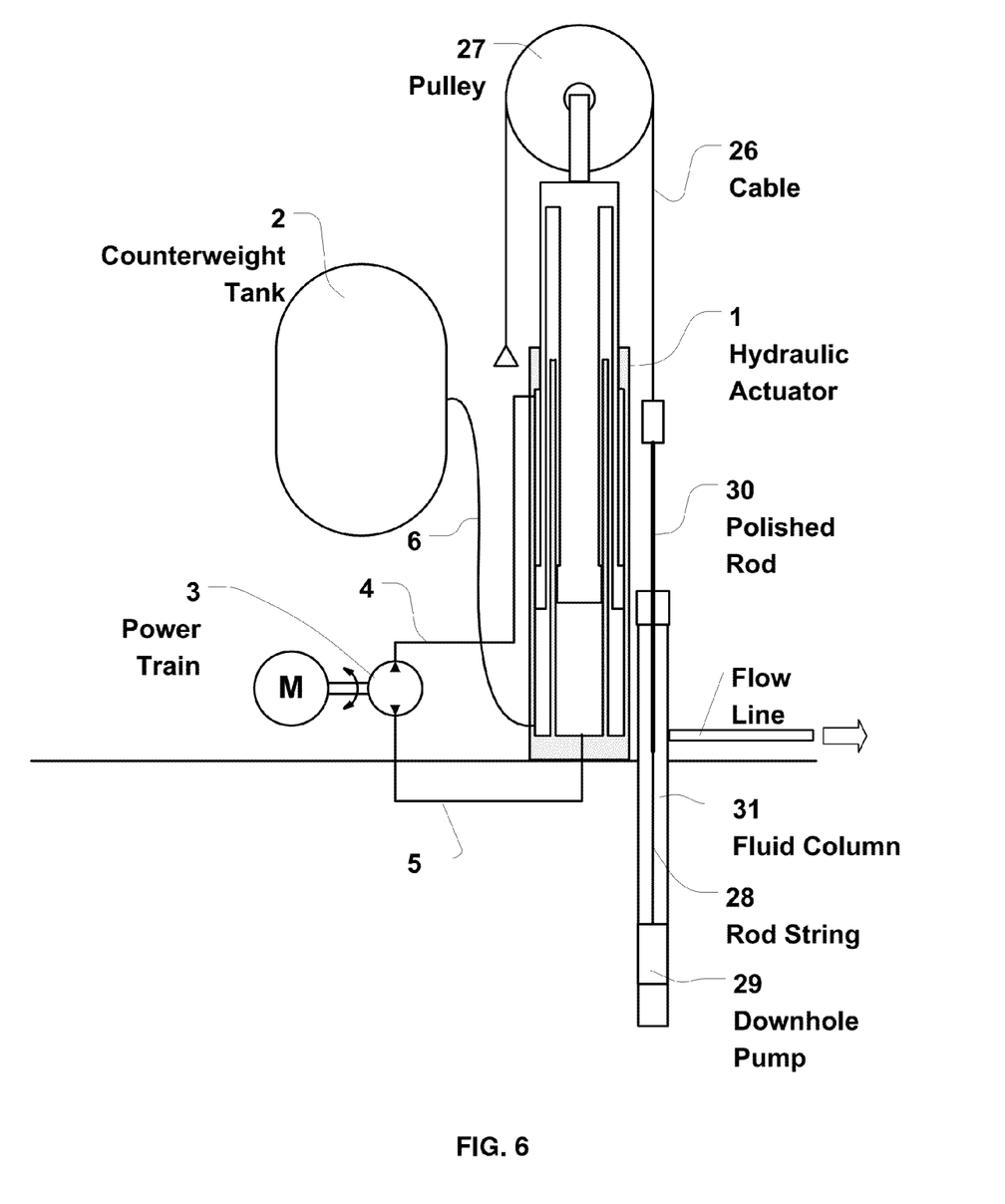
FIG. 6 is a schematic illustration of the disclosed invention as applied to a surface-mounted rod-lifting system on an oil or gas well for recovery of fluids from subsurface formations.

Use of the disclosed invention in a surface-mounted rod-lifting embodiment on an oil or gas well demonstrates its exceptional benefits compared to conventional artificial lifting methods like the popular beam pump (also known as a "horse head" pump). Operation of traditional beam pumps is based on kinematics of a four bar linkage. In a typical embodiment of a beam pump, the circular motion of a crank arm, driven by an electric motor or a combustion engine, is converted by a four-bar linkage into linear reciprocating motion of the polished rod and the downhole pump. The rotating inertia of very large and heavy steel plates is used to counterbalance the "dead weight" of the rod string and the downhole pump. An alternative embodiment of the disclosed invention in a surface-mounted rod-lifting pump application is shown in FIG. 6. This embodiment of the disclosed invention is significantly lighter and smaller than a comparable beam pump. In this embodiment of the disclosed invention, the cargo load up is the lifted fluid column 31 in the well casing tube. In this case, the difference between the maximum payload up and the minimum payload down is equal to the weight of the fluid column. According to the disclosed invention, auxiliary power is used to lift only half of the weight of the lifted fluid column (the useful cargo load), whereas a beam pump requires a least amount of auxiliary power to lift the entire weight of the lifted fluid column (assuming a perfectly efficient counterweight system). According to the disclosed invention, the "dead weights" of the polished rod 30, the rod string 28 and the downhole pump 29, plus the other half of the fluid column are lifted by the counterweight force, acting as a very lightweight self-contained air spring. The disclosed invention, when utilized in a rod-lifting application, presents further advantages compared to traditional beam pumps. A longer stroke, tight motion control and moderate changes in speed mitigate dynamic stressing of the apparatus components, reducing its failure rate, increasing its uptime and saving significant loss of production and repair costs. The use of a pressurized gas counterweight further mitigates dramatically dynamic stressing of the apparatus components compared to prior art, which uses traditionally gravity force of heavy weights as means for counterbalancing.

In addition, the disclosed invention simplifies greatly the method of changing the counterweight force, frequently done when the loads change. According to the disclosed invention, the counterweight force is adjusted by simple and quick adjustment of the gas pressure in the counterweight chamber. Traditional prior art, using heavy weights for counterbalancing, adjusts the counterweight force by adding or removing these heavy weights—a cumbersome, time consuming and labor intensive method compared to the simple, quick and low-cost method disclosed herein.

The terms and examples employed herein are meant as a description of and not a limitation to the scope of the invention. The drawings are meant to be illustrative and are not intended to limit the scope of the invention disclosed. No element described herein is required for the practice of the invention unless it is described as essential or critical. The invention should therefore not be limited by the above described embodiments, methods and examples, but by all embodiments and methods within the scope and spirit of the invention as presented herein.

What is claimed is:

1. A hydro pneumatic counterweighted lifting system for elevating vertically cargo loads, comprising:
    a hydro-pneumatic, double-acting, triple-chamber actuator using hydraulic fluid and gas to reciprocate a load;
    said actuator mounted vertically on a structural base;
    said actuator comprising:
        an outer cylinder vertically mounted on said structural base;
        an outer piston reciprocating inside the bore of said outer cylinder, said outer piston comprising a piston rod and a piston head, said piston head reciprocating inside the bore of said outer cylinder, said piston rod reciprocating in and out of the top end of said outer cylinder, said outer piston reciprocating said load as said piston rod reciprocates in and out of said outer cylinder;
        an inner cylinder affixed to the structural base of said actuator and concentric with said outer cylinder;
        an inner piston affixed at its upper end to the top of said outer piston and concentric with said outer piston, said inner piston comprising at its other end a piston head, said piston head comprising a first face surface, said inner piston reciprocating inside a bore of said inner cylinder;
        a cylinder head affixed to the upper end of said outer cylinder, said piston rod sliding in a bore of said cylinder head;
    wherein said structural base comprises an end cap attached to the bottom of said outer cylinder;
    said actuator further comprising three functional chambers, said chambers comprising:
        a first hydraulic chamber enclosed inside the bore of said inner cylinder beneath said inner piston first face surface, said first chamber having a hydraulic UP port connecting said first chamber to a first utility port of a hydraulic pump, said first chamber, when hydraulically pressurized, forcing said actuator to extend up by applying pressure on said first face surface of said inner piston;
        said first chamber having a circular shaped effective hydraulic area determined by the bore diameter of said inner cylinder, said first chamber effective area sized to provide, at full operating hydraulic pressure, an upward force equal to about half the difference between the maximum cargo load up and the minimum cargo load down;
        a second hydraulic chamber contained between the bore diameter of said outer cylinder and the outer diameter of said outer piston rod, said second chamber comprising a hydraulic DOWN port connecting said second chamber to a second utility port of said hydraulic pump, said second chamber, when hydraulically pressurized, forcing said actuator to retract down by applying hydraulic pressure on said outer piston;
        said second chamber having an annular shape hydraulic effective area, said annular shape contained between the bore diameter of said outer cylinder and the outer diameter of said outer piston rod, said second chamber effective area sized to provide, at full operating hydraulic pressure, a downward force equal to about half the difference between the maximum cargo load up and the minimum cargo load down;
        a third counterweight chamber contained between the bore diameter of said outer cylinder and the bore diameter of said inner cylinder, said third counterweight chamber comprising a counterweight port connecting said third counterweight chamber to at least one pressure vessel, said third counterweight chamber constantly charged with pressurized gas, providing a consistent extension force up;
        said third counterweight chamber having an annular shaped effective area, said annular shaped effective area contained between the bore diameter of said outer cylinder and the bore diameter of said inner cylinder, said third chamber effective area sized to provide said consistent extension force up, said force about equal to the cumulative weight of the unloaded moving parts of the lifting system plus half the difference between the maximum cargo load up and the minimum cargo load down, said force calculated at the minimum operating pressure in said third chamber;
    said actuator further comprising sealing means to prevent leakage of the hydraulic fluids or the pressurized gas out of said chambers;
    said actuator designed to automatically circulate the hydraulic fluid in and out of said hydraulic chambers during normal operation in order to bleed entrapped air, said automatic bleeding accomplished by contracting to minimum the volume of hydraulic fluid in each hydraulic chamber during the course of every duty cycle;
    said first hydraulic chamber decreasing its volume as said inner piston is sliding down into said inner cylinder during downstroke retraction, flushing out all hydraulic fluid and any entrapped air contained in said first hydraulic chamber, except for a small percentage, into the hydraulic system, thereby bleeding out any entrapped air from said first hydraulic chamber during every duty cycle; and said second hydraulic chamber decreasing its volume as said outer piston is sliding up in said outer cylinder during upstroke extension, flushing out all hydraulic fluid and any entrapped air contained in said second hydraulic chamber, except for a small percentage, into the hydraulic system, thereby bleeding out any entrapped air from said second hydraulic chamber during every duty cycle.

2. A lifting system in accordance with claim 1, wherein said at least one pressure vessel comprises a plurality of vessels containing said pressurized gas;
said pressure vessels' internal volumes interconnected to each other via a plurality of conduits, said pressure vessels internal volumes connected to said third counterweight chamber of said actuator via at least one conduit;
said pressure vessels charged with said pressurized gas, said pressurized gas set to apply said consistent extension force up to said outer piston, said force equal to about the cumulative weight of the unloaded moving parts of the lifting system plus half the difference between the maximum cargo load up and the minimum cargo load down, said force calculated at the minimum operating pressure in said third counterweight chamber;
said internal volumes of pressurized gas in said pressure vessels and said actuator adding up to a total volume no smaller than ten times the volume of pressurized gas displaced by said actuator during one stroke, said displaced volume equal to said effective area of said third chamber multiplied by the length of a full stroke of said actuator.

3. A lifting system in accordance with claim 2, wherein said hydraulic pump is part of a power train providing hydraulic flow to reciprocate said actuator;
said hydraulic pump comprises:
a variable displacement closed-circuit hydraulic pump, said pump displacing a variably controlled volume of hydraulic fluid per turn of the pump;
said hydraulic pump coupled to a drive comprising an electric motor, said electric motor powered by grid power or by an auxiliary generator, said drive transferring output torque at constant speed to an input shaft of said hydraulic pump;
said first and second utility ports of said hydraulic pump connected via hydraulic conduits to said hydraulic UP and DOWN ports of said actuator respectively;
said hydraulic pump, when commanded UP, causing hydraulic fluid to flow through said first utility port into said first hydraulic chamber, thereby causing said outer piston to move in the UP direction;
said hydraulic pump, when commanded DOWN, causing hydraulic fluid to flow through said second utility port into second hydraulic chamber, thereby causing said outer piston to move in the DOWN direction.

4. A lifting system in accordance with claim 2, wherein said hydraulic pump is part of a power train providing hydraulic flow to reciprocate said actuator;
said hydraulic pump comprises:
a variable displacement closed-circuit hydraulic pump, said pump displacing a variably controlled volume of hydraulic fluid per turn of the pump;
said hydraulic pump coupled to a drive comprising a combustion engine, said drive transferring output torque at constant speed to an input shaft of said hydraulic pump;
said first and second utility ports of said hydraulic pump connected via hydraulic conduits to said hydraulic UP and DOWN ports of said actuator respectively;
said hydraulic pump, when commanded UP, causing hydraulic fluid to flow through said first utility port into said first hydraulic chamber, thereby causing said outer piston to move in the UP direction;
said hydraulic pump, when commanded DOWN, causing hydraulic fluid to flow through said second utility port into said second hydraulic chamber, thereby causing said outer piston to move in the DOWN direction.

5. A lifting system in accordance with claim 2, wherein said hydraulic pump is part of a power train providing hydraulic flow to reciprocate said actuator;
said hydraulic pump comprises:
a fixed displacement closed-circuit hydraulic pump, displacing a fixed volume of hydraulic fluid per turn of the pump;
said hydraulic pump coupled to an electric motor, said electric motor powered by grid power or by an auxiliary generator, said motor transferring output torque to an input shaft of said hydraulic, the direction of rotation and speed of said electric motor controlled by a variable speed drive, said variable speed drive controlling the voltage and frequency of AC power to said electric motor, thereby controlling the direction and speed of rotation of said motor and said coupled hydraulic pump;
said first and second utility ports of said hydraulic pump connected via hydraulic conduits to said hydraulic UP and DOWN ports of said actuator respectively;
said hydraulic pump, when commanded UP, spinning in one direction, causing hydraulic fluid to flow through said first utility port into the first hydraulic chamber, thereby causing said outer piston to move in the UP direction;
said hydraulic pump, when commanded DOWN, spinning in the opposite direction, causing hydraulic fluid to flow through said second utility port into the second hydraulic chamber, thereby causing said outer piston to move in the DOWN direction.

6. A lifting system in accordance with claim 3, 4 or 5, further comprising a control system;
said control system comprising monitoring devices, including at least one position sensor monitoring continuously the stroke of said actuator, a plurality of pressure sensors monitoring continuously pressures in each of said chambers of said actuator and a plurality of flow and pressure control valves;
said monitoring devices supplying data to a programmable logic controller (PLC);
said data processed and acted upon by algorithms by the PLC, providing motion commands to said lifting system;
said control system controlling motion parameters of the lifting system, including position, direction, velocity, start-stop, acceleration and deceleration by controlling the hydraulic flow to said actuator;
said control system changing said motion parameters in real time by adjusting hydraulic flow to said actuator on both upstroke and downstroke.

7. The lifting system in accordance with claim 1, further comprising cushioning means to avoid impact loads when said outer piston comes to stop at its up and down end strokes, said cushioning means slowing down the velocity of said outer piston as it approaches end stroke by metering hydraulic fluid through said hydraulic UP and DOWN ports;
said means for downstroke cushioning comprising a dome shaped pin mounted onto said first face of said inner piston and a first cylindrical cavity in said end cap, said first cavity connected to said hydraulic UP port of said first chamber, said first cavity having a slightly bigger diameter than said pin, said pin forming a first annular orifice between said pin and said first cavity when entering said first cavity, thus forcing hydraulic fluid in said first hydraulic chamber to flow out through said first annular orifice, thereby slowing down said outer piston;

said pin having a variable longitudinal profile, said first annular orifice cross section area decreasing as said pin moves into said first cavity, said profile shaped to provide a desired deceleration of said outer piston;

said means for downstroke cushioning further comprising a first check valve between said hydraulic UP port and said first hydraulic chamber, said valve enabling one way flow from said hydraulic UP port to said first hydraulic chamber and blocking flow in the opposite direction, thus enabling unrestricted hydraulic flow into said first hydraulic chamber on upstroke;

said means for upstroke cushioning comprising a sleeve mounted onto said outer piston rod adjacent to said outer piston head and a second cylindrical cavity in said cylinder head, said second cavity connected to said hydraulic DOWN port of said second hydraulic chamber, said second cavity having a slightly bigger diameter than said sleeve, said sleeve forming a second annular orifice between said sleeve and said second cavity when entering said second cavity, thus forcing hydraulic fluid in said second hydraulic chamber to flow out through said second annular orifice, thereby slowing down said outer piston;

said sleeve having a variable longitudinal profile, said second annular orifice cross section area decreasing as said sleeve moves into said second cavity, said profile shaped to provide a desired deceleration of said outer piston;

said means for upstroke cushioning further comprising a second check valve between said hydraulic DOWN port and said second hydraulic chamber, said valve enabling one way flow from said hydraulic DOWN port to said second hydraulic chamber and blocking flow in the opposite direction, thus enabling unrestricted hydraulic flow into said second hydraulic chamber on downstroke.

8. The lifting system in accordance with claim 1, further comprising:

at least one pulley affixed to the top of said outer piston;

at least one cable wrapped around the top of said pulley, one end of each said cable anchored to a stationary point, the lifted loads suspended from the other end of each of said cable; and said load reciprocating freely as outer piston moves up and down, said load reciprocating at twice the speed and stroke of the outer piston.

9. The lifting system in accordance with claim 1, further comprising:

at least one gear wheel affixed to the top of said outer piston;

at least one chain wrapped around the top of said gear wheel, one end of each said chain anchored to a stationary point, the lifted loads suspended from the other end of each of said chain; and said load reciprocating freely as outer piston moves up and down, said load reciprocating at twice the speed and stroke of the outer piston.

10. The lifting system in accordance with claim 1, further comprising:

at least one sheave affixed to the top of said outer piston;

at least one belt wrapped around the top of said sheave, one end of each said belt anchored to a stationary point, the lifted loads suspended from the other end of each of said belt; and said load reciprocating freely as outer piston moves up and down, said load reciprocating at twice the speed and stroke of the outer piston.

11. A rod-lifting system for extraction of fluids from subsurface formations, including a subsurface downhole pump immersed in a casing tube and connected via a rod string to a surface-mounted lifting system, said lifting system reciprocating the downhole pump up and down, lifting a column of fluid and gas mixture in every stroking cycle;

said lifting system comprising:

a hydro-pneumatic, double-acting, triple-chamber actuator using hydraulic fluid and gas to reciprocate a load;

said actuator mounted vertically on a structural base;

said actuator comprising:

an outer cylinder vertically mounted on said structural base;

an outer piston reciprocating inside the bore of said outer cylinder, said outer piston comprising a piston rod and a piston head, said piston head reciprocating inside the bore of said outer cylinder, said piston rod reciprocating in and out of the top end of said outer cylinder, said outer piston reciprocating said load as said piston rod reciprocates in and out of said outer cylinder;

an inner cylinder affixed to the structural base of said actuator and concentric with said outer cylinder;

an inner piston affixed at its upper end to the top of said outer piston and concentric with said outer piston, said inner piston comprising at its other end a piston head, said piston head comprising a first face surface, said inner piston reciprocating inside a bore of said inner cylinder;

a cylinder head affixed to the upper end of said outer cylinder, said piston rod sliding in a bore of said cylinder head;

wherein said structural base comprises an end cap attached to the bottom of said outer cylinder;

said actuator further comprising three functional chambers, said chambers comprising:

a first hydraulic chamber enclosed inside the bore of said inner cylinder beneath said inner piston first face surface, said first chamber having a hydraulic UP port connecting said first chamber to a first utility port of a hydraulic pump, said first chamber, when hydraulically pressurized, forcing said actuator to extend up by applying pressure on said first face surface of said inner piston;

said first chamber having a circular shaped effective hydraulic area determined by the bore diameter of said inner cylinder, said first chamber effective area sized to provide, at full operating hydraulic pressure, an upward force equal to about half the weight of the fluid column in the well casing tube;

a second hydraulic chamber contained between the bore diameter of said outer cylinder and the outer diameter of said outer piston rod, said second chamber comprising a hydraulic DOWN port connecting said second chamber to second utility port of said hydraulic pump, said second chamber, when hydraulically pressurized, forcing said actuator to retract down by applying hydraulic pressure on said outer piston;

said second chamber having an annular shape hydraulic effective area, said annular shape contained between the bore diameter of said outer cylinder and the outer diameter of said outer piston rod, said second chamber effective area sized to provide, at full operating hydraulic pressure, a downward force equal to about half the weight of the fluid column in the well casing tube;

a third counterweight chamber contained between the bore diameter of said outer cylinder and the bore diameter of said inner cylinder, said third counterweight chamber comprising a counterweight port connecting said third counterweight chamber to at least one pressure vessel, said third counterweight chamber constantly charged with pressurized gas, providing a consistent extension force up;

said counterweight third chamber having an annular shaped effective area, said annular shaped effective area contained between the bore diameter of said outer cylinder and the bore diameter of said inner cylinder, said third chamber effective area sized to provide an upward force, said force about equal to the cumulative weight of the unloaded moving parts of the lifting system, rod string and downhole pump, plus half the weight of the fluid column in the well casing tube, said force calculated at the minimum operating pressure in said third chamber;

said actuator further comprising sealing means to prevent leakage of the hydraulic fluids or the pressurized gas out of said chambers;

said actuator designed to automatically circulate the hydraulic fluid in and out of said hydraulic chambers during normal operation, in order to bleed entrapped air, said automatic bleeding accomplished by contracting to minimum the volume of hydraulic fluid in each hydraulic chamber during the course of every duty cycle;

said first hydraulic chamber decreasing its volume as said inner piston is sliding down into said inner cylinder during downstroke retraction, flushing out all hydraulic fluid and any entrapped air contained in said first hydraulic chamber, except for a small percentage, into the hydraulic system, thereby bleeding out any entrapped air from said first hydraulic chamber during every duty cycle; and said second hydraulic chamber decreasing its volume as said outer piston is sliding up in said outer cylinder during upstroke extension, flushing out all hydraulic fluid and any entrapped air contained in said second hydraulic chamber, except for a small percentage, into the hydraulic system, thereby bleeding out any entrapped air from said second hydraulic chamber during every duty cycle.

12. A lifting system in accordance with claim 11, wherein said at least one pressure vessel comprises a plurality of vessels containing said pressurized gas;

said pressure vessels' internal volumes interconnected to each other via a plurality of conduits, said pressure vessels' internal volumes connected to said third counterweight chamber of said actuator via at least one conduit;

said pressure vessels charged with said pressurized gas, said pressurized gas set to apply-a said consistent extension force up to said outer piston, said force equal to about the cumulative weight of the unloaded moving parts of the lifting system, rod string and downhole pump, plus half the weight of the fluid column in the well casing tube, said force calculated at the minimum operating pressure in said third counterweight chamber;

said internal volumes of pressurized gas in said pressure vessels and said actuator adding up to a total volume no smaller than ten times the volume of pressurized gas displaced by said actuator during one stroke, said displaced volume equal to said effective area of said third chamber multiplied by the length of a full stroke of said actuator.

13. A lifting system in accordance with claim 12, wherein said hydraulic pump is part of a power train providing hydraulic flow to reciprocate said actuator;

said hydraulic pump comprises:

a variable displacement closed-circuit hydraulic pump, said pump displacing a variably controlled volume of hydraulic fluid per turn of the pump;

said hydraulic pump coupled to a drive comprising an electric motor, said electric motor powered by grid power or by an auxiliary generator, said drive transferring output torque at constant speed to an input shaft of said hydraulic pump;

said first and second utility ports of said hydraulic pump connected via hydraulic conduits to said hydraulic UP and DOWN ports of said actuator respectively;

said hydraulic pump, when commanded UP, causing hydraulic fluid to flow through said first utility port into said first hydraulic chamber, thereby causing said outer piston to move in the UP direction;

said hydraulic pump, when commanded DOWN, causing hydraulic fluid to flow through said second utility port into said second hydraulic chamber, thereby causing said outer piston to move in the DOWN direction.

14. A lifting system in accordance with claim 12, wherein said hydraulic pump is part of a power train, providing hydraulic flow to reciprocate said actuator;

said hydraulic pump comprises:

a variable displacement closed-circuit hydraulic pump, said pump displacing a variably controlled volume of hydraulic fluid per turn of the pump;

said hydraulic pump coupled to a drive comprising a combustion engine, said drive transferring output torque at constant speed to an input shaft of said hydraulic pump;

said first and second utility ports of said hydraulic pump connected via hydraulic conduits to said hydraulic UP and DOWN ports of said actuator respectively;

said hydraulic pump, when commanded UP, causing hydraulic fluid to flow through said first utility port into said first hydraulic chamber, thereby causing said outer piston to move in the UP direction;

said hydraulic pump, when commanded DOWN, causing hydraulic fluid to flow through said second utility port into said second hydraulic chamber, thereby causing said outer piston to move in the DOWN direction.

15. A lifting system in accordance with claim 12, wherein said hydraulic pump is part of a power train, providing hydraulic flow to reciprocate said actuator;

said hydraulic pump comprises:

a fixed displacement closed-circuit hydraulic pump, displacing a fixed volume of hydraulic fluid per turn of the pump;

said hydraulic pump coupled to an electric motor, said electric motor powered by grid power or by an auxiliary generator, said motor transferring output torque to an input shaft of said hydraulic pump, the direction of rotation and speed of said electric motor controlled by a variable speed drive, said variable speed drive controlling the voltage and frequency of AC power to said electric motor, thereby controlling the direction and speed of rotation of said motor and said coupled hydraulic pump;

said first and second utility ports of said hydraulic pump connected via hydraulic conduits to hydraulic UP and DOWN ports of said actuator respectively;

said hydraulic pump, when commanded UP, spinning in one direction, causing hydraulic fluid to flow through said first utility port into said first hydraulic chamber, thereby causing said outer piston to move in the UP direction;

said hydraulic pump, when commanded DOWN, spinning in the opposite direction, causing hydraulic fluid to flow through said second utility port into said second hydraulic chamber, thereby causing the actuator piston to move in the DOWN direction.

16. A lifting system in accordance with claim 13, 14 or 15, further comprising a control system;

said control system comprising monitoring devices, including at least one position sensor monitoring continuously the stroke of said actuator, a plurality of pressure sensors monitoring continuously pressures in each of said chambers of said actuator and a plurality of flow and pressure control valves;

said control system comprising monitoring devices collecting well and downhole data;

said monitoring devices supplying data to a programmable logic controller (PLC);

said data processed and acted upon by algorithms by said PLC, providing motion commands to said lifting system;

said control system controlling motion parameters of the lifting system, including position, direction, velocity, start-stop, acceleration and deceleration by controlling the hydraulic flow to said actuator;

said control system changing motion parameters in real time by adjusting hydraulic flow to said actuator on both upstroke and downstroke.

17. The lifting system in accordance with claim 11, further comprising cushioning means to avoid impact loads when said outer piston comes to stop at its up and down end strokes, said cushioning means slowing down the velocity of said outer piston as it approaches end stroke by metering hydraulic fluid through said hydraulic UP and DOWN ports;

said means for downstroke cushioning comprising a dome shaped pin mounted onto said first face of said inner piston and a first cylindrical cavity in said end cap, said first cavity connected to said hydraulic UP port of said first chamber, said first cavity having a slightly bigger diameter than said pin, said pin forming a first annular orifice between said pin and said first cavity when entering said first cavity, thus forcing hydraulic fluid in said first hydraulic chamber to flow out through said first annular orifice, thereby slowing down said outer piston;

said pin having a variable longitudinal profile, said first annular orifice cross section area decreasing as said pin moves into said first cavity, said profile shaped to provide a desired deceleration of said outer piston;

said means for downstroke cushioning further comprising a first check valve between said hydraulic UP port and said first hydraulic chamber, said valve enabling one way flow from said hydraulic UP port to said first hydraulic chamber and blocking flow in the opposite direction, thus enabling unrestricted hydraulic flow into said first hydraulic chamber on upstroke;

said means for upstroke cushioning comprising a sleeve mounted onto said outer piston rod adjacent to said outer piston head and a second cylindrical cavity in said cylinder head, said second cavity connected to said hydraulic DOWN port of said second hydraulic chamber, said second cavity having a slightly bigger diameter than said sleeve, said sleeve forming a second annular orifice between said sleeve and said second cavity when entering said second cavity, thus forcing hydraulic fluid in said second hydraulic chamber to flow out through said second annular orifice, thereby slowing down said outer piston;

said sleeve having a variable longitudinal profile, said second annular orifice cross section area decreasing as said sleeve moves into said second cavity, said profile shaped to provide a desired deceleration of said outer piston;

said means for upstroke cushioning further comprising a second check valve between said hydraulic DOWN port and said second hydraulic chamber, said valve enabling one way flow from said hydraulic DOWN port to said second hydraulic chamber and blocking flow in the opposite direction, thus enabling unrestricted hydraulic flow into said second hydraulic chamber on downstroke.

18. The lifting system in accordance with claim 11, further comprising:

at least one pulley affixed to the top of said outer piston;

at least one cable wrapped around the top of said pulley, one end of each said cable anchored to a stationary point, a polished rod connected to the other end of said cable, the polished rod, the rod string and the downhole pump reciprocating at twice the speed and stroke of the outer piston.

19. The lifting system in accordance with claim 11, further comprising:

at least one gear wheel affixed to the top of said outer piston;

at least one chain wrapped around the top of said gear wheel, one end of each said chain anchored to a stationary point, a polished rod connected to the other end of said chain, the polished rod, the rod string and the downhole pump reciprocating at twice the speed and stroke of the outer piston.

20. The lifting system in accordance with claim 11, further comprising:

at least one sheave affixed to the top of said outer piston;

at least one belt wrapped around the top of said sheave, one end of each said belt anchored to a stationary point, a polished rod connected to the other end of said belt, the polished rod, the rod string and the downhole pump reciprocating at twice the speed and stroke of the outer piston.

* * * * *